April 12, 1960     R. G. UTTER     2,932,724
ARC-WELDING TORCH
Filed Dec. 12, 1958

United States Patent Office 2,932,724
Patented Apr. 12, 1960

2,932,724

ARC-WELDING TORCH

Rodney G. Utter, Philadelphia, Pa., assignor to Superior Tube Company, Norristown, Pa., a corporation of Pennsylvania Application December 12, 1958, Serial No. 779,930

4 Claims. (Cl. 219—75)

This invention relates to arc-welding torches and is particularly directed to torches for arc-welding of small pieces and thin sections disposed in a protective atmosphere of inert gas.

An object of the invention is to provide a small, light arc-welding torch which can be manipulated much like a pencil in confined spaces with maximum freedom of restraint from supply hoses or supply conductors.

In accordance with the present invention, the tube which supplies the inert gas to the welding region also serves as a body member of the torch and has an electrical conductor for supplying current to an electrode holder mounted on the gas discharge end of the tube. The torch handle or second body member is a sleeve surrounding the gas supply tube and made of electrical and heat-insulation material. The electrode holder is adjustably pivotally mounted at the nozzle end of the gas supply tube for control of the gas concentration in the region of and adjacent to the welding puddle.

The invention further resides in a welding torch having features of combination and arrangement hereinafter described and claimed.

For a more complete understanding of the invention, reference is made in the following description of a preferred embodiment thereof to the accompanying drawings in which.

Referring to Figs. 1 to 4, the body of the torch 10 consists of a short length of thin metal tubing 11 and a somewhat longer and thicker sleeve 12 of insulating material. By way of specific example, the tubing 11 may be a six-inch length of beryllium copper tubing having an outer diameter of about ⅜ inch and a wall thickness of about 0.05 inch. The sleeve 12 may be "Synthane" tubing with a wall thickness of about 3/16 inch.

Figure 1:
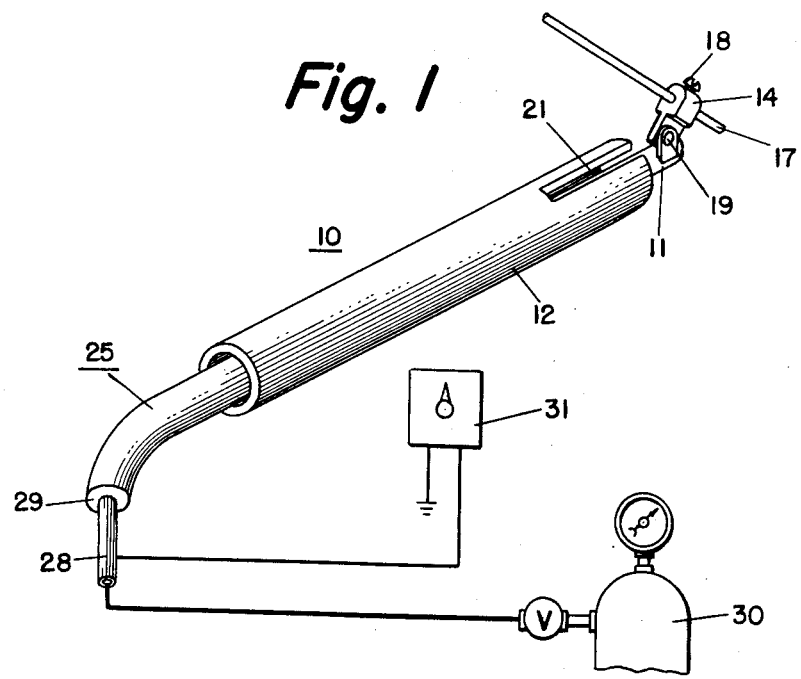
Fig. 1 is a perspective view of a welding torch connected to its supply cable.
Figure 2:
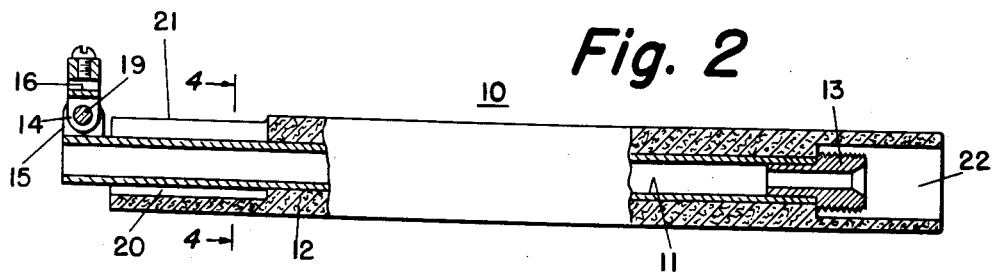
Fig. 2 is a side elevational view, partly in section, of the torch shown in Fig. 1.
Figure 3:
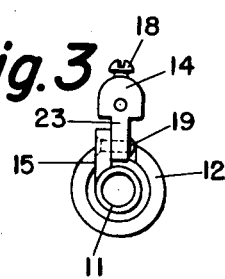
Fig. 3 is an end elevational view of Fig. 2.
Figure 4:
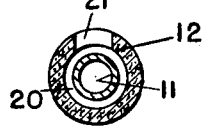
Fig. 4 is a cross-sectional view taken on line 4—4 of Fig. 2.
Figure 5:
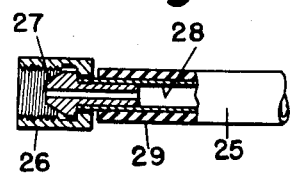
Fig. 5 is a side elevational view, in section, of the supply cable and its torch-fitting.

The supply end of tube 11 is provided with a metal fitting 13 for coupling it to a flexible cable 25 which supplies electrical current and inert gas to the torch. The internally threaded cap 26 is free to rotate about and slide axially of the shank portion of the cable fitting 27. When the cap is grooved onto the tube fitting 13, it forces the fittings 13 and 27 into mating engagement. As schematically indicated in Fig. 1, the other end of the cable 25 is connected to a supply source 30 of helium, argon or other inert gas and also to a current supply source 31. The supply sources are provided with conventional means, not shown, for regulating the gas pressure and the amperage. The flexible cable 25 may be of standard type comprising a flexible hollow conductor 28, such as metallic braid or coiled wire encased in plastic tubing 29.

Preferably and as shown, the cable end of sleeve 12 extends beyond the tube fitting 13 and has an enlarged bore 22 to receive the cap 26 of supply cable 25. To facilitate connection of the cable 25 to the torch 10, the sleeve 12 may be slipped to the left from the position shown in Fig. 2 to expose the fitting 13. After the connection has been made, the sleeve 12 is slipped back to the original position for which it avoids accidental grounding of the torch by engagement of the cable cap 26 with a grounded machine frame or the like.

At its nozzle end, the tube 11 is provided with an electrode holder 14 pivotally mounted, as by a rivet or clamp screw 19 on the mount 15 brazed or welded to tube 11. The head of the holder 14 has a bore 16 which slidably receives a welding rod electrode, usually of tungsten, held in position by the clamping screw 18 or equivalent. The angular position of the electrode 17 relative to the axis of the torch body can be varied over a wide range to permit the discharged gas flow to be concentrated on the portion of the work where it is needed for protective purposes. This permits the width and location of the weld puddle to be closely controlled by variation of the direction and velocity of the gas issuing from the nozzle end of tube 11.

Another advantage of the pivoted holder construction is that of greater electrode economy since it is feasible to use all but ⅜ inch of the electrode. In other types, as much as 1 to 1¼ inches of the expensive tungsten rod must be scrapped.

The slot 21 in the forward end of sleeve 12 has several purposes. It provides clearance for electrode holder 14 and its mount when the sleeve 12 is slid along tube 11 to make the cable couplings or fittings accessible for connection or disconnection of the torch and the supply cable. For this purpose, the length of the slot 21 is at least the length of the bore 22 which in turn is not substantially less than the length of the cable cap 26. In combination with the enlarged bore 20 at the forward end of sleeve 12, the slot 21 provides a passage for flow of air about the discharge end of tube 11 to dissipate heat transferred to it from the arc and the heated work. This is particularly of advantage when the torch is manually held. The flow of air through slot 21 is at least in part due to induction action of gas issuing from the nozzle end of tube 11. The width of the slot 21 in sleeve 12 closely approximates the combined width of the mount 15 and the shank 23 of the electrode holder 14. Thus, with the sleeve 12 displaced to the left from the position shown in Fig. 2, the side walls of the slot prevent the electrode from rotating with respect to the sleeve as it otherwise could upon engagement of the electrode with the work or other object despite the torque developed in cable 25 as the torch is moved to various positions. The slot 21 also permits the sleeve to be moved to positions for which it extends beyond the nozzle end of tube 11 so to increase the concentration of the protective gas for control of movement of the weld puddle.

The small size and light weight (about 2.5 ounces) of the torch permits it to be manipulated manually like a pencil. With the single supply cable attached to one end of the torch body and with air-cooling of the nozzle end, the torch can be used in confined spaces where it is not feasible to use torches of usual type in which external gas and cooling liquid hoses are connected to the torch head. The construction disclosed also avoids the use of ceramic cups which are easily broken and give rise to heat dissipation problems. Though well suited for manual manipulation, the torch disclosed has proved to be also well suited for use in automatic welding machines on low-amperage work (up to about 60 amperes), in which case the sleeve 12 of the torch is held by a clamp to the machine frame or slide.

What is claimed is:

1. A pencil torch for inert-gas arc-welding comprising a metal tube, coupling means at one end of said tube for connection to a flexible cable supplying electrical current and inert gas, a rod-electrode holder pivotally mounted on the opposite end of said tube for angular adjustment of the electrode relative to the path of gas discharged from said opposite end, said holder including means for adjustably clamping the rod electrode with its tip in selected position beyond said opposite end of the tube, and a sleeve of insulating material snugly and slidably receiving said tube and having a slot to clear said electrode-holder as said sleeve is adjusted to extend beyond said opposite end of the tube.

2. A pencil torch for inert-gas arc-welding comprising a metal tube, coupling means at one end of said tube for connection to a flexible cable supplying electrical current and inert gas, a rod-electrode holder pivotally mounted on the opposite end of said tube for angular adjustment of the electrode relative to the path of gas discharged from said opposite end, said holder including means for adjustably clamping the rod-electrode with its tip in selected position beyond said opposite end of the tube, and a sleeve of insulating material snugly and slidably receiving said tube, said sleeve at one end having an enlarged bore for receiving the cable coupling connected to said coupling means of the tube and having at its opposite end an elongated guide slot clearing said electrode-holder as said sleeve is adjusted to extend beyond said opposite end of said tube.

3. An inert-gas arc-welding torch comprising a metal tube having at one open end coupling means for connection to a flexible cable supplying inert gas, a rod-electrode holder pivotally mounted on the opposite open end of said tube for angular adjustment of the electrode in a region into which said gas is discharged, and a sleeve of insulating material snugly engaging said metal tube intermediate said ends thereof and having a larger bore extending inwardly from said holder-end of the metal tube and in communication with at least one passage extending through the sleeve wall for flow of cooling air.

4. An inert-gas arc-welding torch comprising a sleeve of insulating material having opposite ends of bore larger than the bore intermediate its end, a metal tube of diameter snugly slidably engaging the intermediate bore of said sleeve and having a nozzle end portion extending through and outwardly beyond the larger bore at one end of said sleeve and having a supply end portion terminating within the larger bore at the other end of said sleeve for connection to a cable supplying electrical current and inert gas, and a rod-electrode holder pivotally mounted on the projecting nozzle end of said metal tube for angular adjustment of the electrode in the gas discharge region adjacent said nozzle end, said sleeve having at the holder-end portion of said tube a slot extending through the sleeve wall to clear said electrode-holder during adjustment of said sleeve and providing for flow of air from the atmosphere into and along the larger sleeve bore for cooling of said holder-end portion of the metal tube.

References Cited in the file of this patent

UNITED STATES PATENTS

| 1,534,688 | Collins | Apr. 21, 1925 |
| 1,727,986 | Jones | Sept. 10, 1929 |
| 2,706,236 | Stepath et al. | Apr. 12, 1955 |
| 2,723,332 | Peterson | Nov. 8, 1955 |